United States Patent [19]

Tanimizu

[11] Patent Number: 5,245,506
[45] Date of Patent: Sep. 14, 1993

[54] SWITCHBOARD AND MULTI-STAGE SWITCHBOARD ASSEMBLY

[75] Inventor: Toru Tanimizu, Hitachi, Japan

[73] Assignee: Hitachi, Ltd., Tokyo, Japan

[21] Appl. No.: 832,393

[22] Filed: Feb. 7, 1992

[30] Foreign Application Priority Data

Feb. 8, 1991 [JP] Japan ................................. 3-017454

[51] Int. Cl.$^5$ ............................................. H02B 1/04
[52] U.S. Cl. ................................. 361/605; 307/147;
361/614; 361/652
[58] Field of Search .................... 307/113, 147, 148;
200/307, 50 A, 50 AA, 48 R, 48 V, 48 SB, 144
B, 145; 361/335-338, 341, 342, 344, 356, 361,
363, 376, 396

[56] References Cited

U.S. PATENT DOCUMENTS

| 4,477,701 | 10/1984 | Castonguay | 200/50 AA |
| 4,504,885 | 3/1985 | Yoshikawa | 361/342 |
| 4,831,489 | 5/1989 | Ozu | 361/338 |
| 4,866,569 | 9/1989 | Okumura | 361/335 |

FOREIGN PATENT DOCUMENTS

| 112111 | 11/1968 | Denmark | 361/336 |
| 0017545 | 10/1980 | European Pat. Off. . | |
| 0128130 | 12/1984 | European Pat. Off. . | |
| 0412368 | 2/1991 | European Pat. Off. . | |
| 1193142 | 5/1965 | Fed. Rep. of Germany . | |
| 6802577 | 3/1969 | Fed. Rep. of Germany . | |
| 1934803 | 8/1970 | Fed. Rep. of Germany | 361/336 |
| 1533266 | 2/1969 | France . | |
| 58-175902 | 10/1983 | Japan . | |
| 3-74118 | 3/1991 | Japan . | |
| 559441 | 1/1974 | Switzerland | 361/336 |

Primary Examiner—Gerald P. Tolin
Attorney, Agent, or Firm—Antonelli, Terry Stout & Kraus

[57] ABSTRACT

A switchboard assembly comprises a plurality of circuit breaker compartments each having plural-phase power supply side disconnecting parts and load side disconnecting parts disposed thereinside, a plurality of conductor compartments having plural-phase power supply buses disposed thereinside, and a plurality of circuit breakers each having plural-phase circuit breaking parts accommodated in each of the circuit breaker compartments. In the switchboard assembly, the plural-phase circuit breaking parts are disposed in the depthwise direction of the circuit breaker compartments, and each of the conductor compartments is disposed between the opposing ones of the circuit breaker compartments so as to reduce the overall size of the switchboard assembly.

4 Claims, 6 Drawing Sheets

SWITCHBOARD AND MULTI-STAGE SWITCHBOARD ASSEMBLY

BACKGROUND OF THE INVENTION

This invention relates to a switchboard assembly having an improved arrangement of power supply side buses and associated contact members making electrical contact with the respective power supply side buses in a housing.

A power receiving/substation equipment is commonly used so as to supply power to a load, for example, an electrical equipment in a building, a sewerage system or a railway system. A switchboard is usually used as one of the major components of the power receiving/substation equipment so as to control electric power supplied from a power source to such a load. Depending on the required function of the load, as many as several to several hundred switchboards are juxtaposed in parallel. When the switchboards amounting to a total number of several hundreds are arranged in parallel (line-up of switchgear), they occupy a considerably large area especially in the widthwise direction.

Therefore, it is a common practice to stack switchboards over multiple stages so as to reduce the area occupied in the widthwise direction of the stack.

Also, JP-A-58-175902 discloses a technique for reducing the area occupied by a switchboard. According to the disclosure of the cited application, a partition wall is provided in the housing of the switchboard so that a circuit breaker compartment is formed on one side, while a conductor compartment extending in the depthwise direction is formed on the other side. Power supply side and load side three-phase disconnecting parts communicating with these breaker and conductor compartments are disposed in three phases above and beneath the partition wall. A pair of power supply side disconnecting parts disposed opposite to each other through a partition plate partitioning each breaker compartment are connected by electrical conductors on the side of the conductor compartment. Three-phase power supply buses are connected to these electrical conductors.

Thus, because the power supply side disconnecting parts and the electrical conductors in the conductor compartment extend in the depthwise direction, not only the power supply side disconnecting parts and the electrical conductors become inevitably long, but also their dimensions in the depthwise direction inevitably increase. Therefore, the prior art switchboard has been defective in that the desired reduction of the size cannot be attained, and the requirement for establishing many electrical connections between the power supply side disconnecting parts, the electrical conductors, the power supply buses, etc. leads inevitably to the difficulty of the connection work.

SUMMARY OF THE INVENTION

It is an object of the present invention to reduce the size of such a switchboard and also to reduce the floor area occupied by the switchboard.

Another object of the present invention is to provide a switchboard assembly in which power supply side disconnecting parts in each circuit breaker compartment can be connected with a shortest possible distance and with minimal electrical connections.

In accordance with one aspect of the present invention which attains the above objects, there is provided a switchboard assembly comprising a plurality of circuit breaker compartments stacked over multiple stages, power supply side disconnecting parts and load side disconnecting parts disposed in each of the circuit breaker compartments, and a conductor compartment formed between the opposing ones of the circuit breaker compartments, the power supply side disconnecting parts being disposed in each of the conductor compartments.

According to another aspect of the present invention which attains the above objects, there is provided a switchboard assembly comprising a plurality of circuit breaker compartments each having plural-phase power supply side disconnecting parts and load side disconnecting parts disposed thereinside, a plurality of conductor compartments each having plural-phase power supply buses disposed thereinside, and a plurality of circuit breakers each having plural-phase circuit breaking parts accommodated in each of the circuit breaker compartments, the plural-phase breaking parts being disposed in the depthwise direction of each of the circuit breaker compartments, and each of the conductor compartments being disposed between the opposing ones of the circuit breaker compartments.

In the present invention, the three-phase breaking parts, which were disposed in the widthwise direction in the case of the prior art switchboard, are disposed in the depthwise direction of the switchboard so as to reduce the width of the switchboard. Further, in the present invention, the power supply side and load side disconnecting parts, which were disposed in the depthwise direction in the case of the prior art switchboard, are disposed in a direction longitudinal (lateral) with respect to the moving direction of the breaking parts so as to reduce the depth of the switchboard thereby reducing the size of the switchboard.

Thus, because of the switchboard structure of the present invention in which such circuit breakers are stacked over multiple stages, the overall size of the switchboard assembly consisting of a plurality of switchboards can be reduced. Further, as described above, the power supply side and load side disconnecting parts are disposed in the direction longitudinal (lateral) with respect to the moving direction of the circuit breaking parts so that the length of the electrical conductors connecting between the electrical parts can be shortened.

BRIEF DESCRIPTION OF THE DRAWINGS

These and other objects of the present invention will become apparent by reference to the following description and accompanying drawings wherein:

FIGS. 1A and 1B show a switchboard assembly of two-stage stacked type which is an embodiment of the present invention, in which FIG. 1A is a schematic front elevational view of the switchboard assembly, and FIG. 1B is a schematic side elevational view when viewed from the direction of the line Z—Z in FIG. 1A;

DESCRIPTION OF THE PREFERRED EMBODIMENTS

Preferred embodiments of the switchboard assembly according to the present invention will now be described in detail by reference to the accompanying drawings.

Figure 1A:
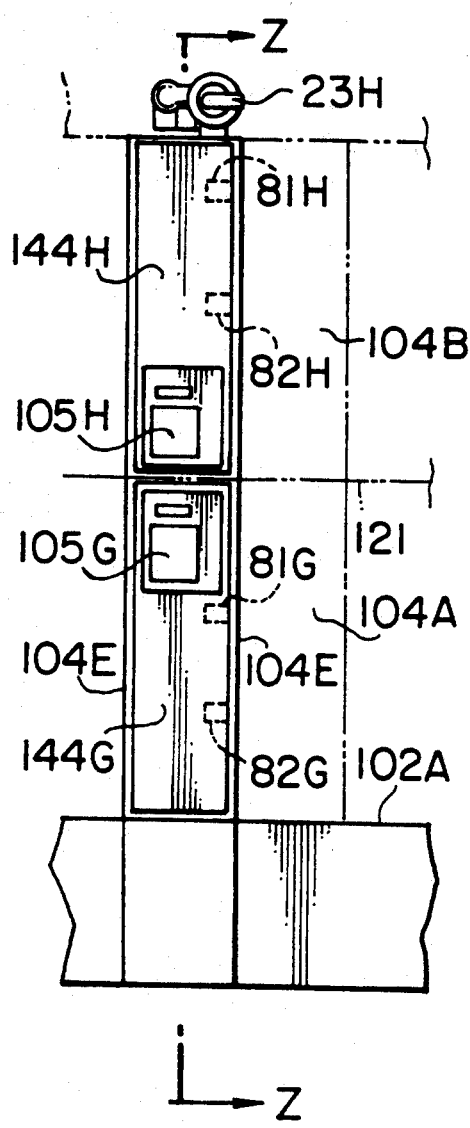
Figure 1B:
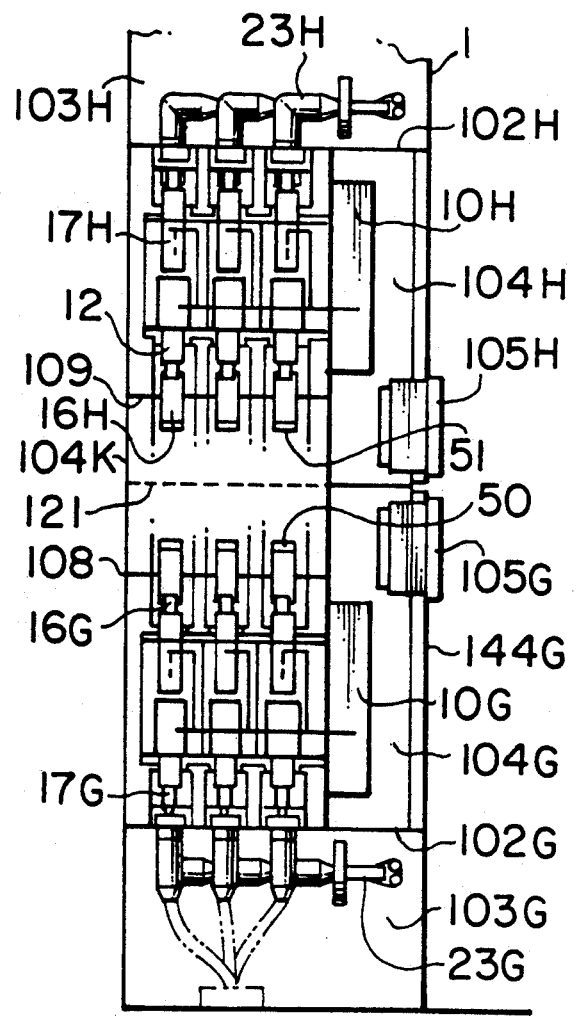

FIG. 1A is a schematic front elevational view of a switchboard assembly of two-stage stacked type embodying the present invention, and FIG. 1B is a schematic side elevational view when viewed from the direction of the line Z—Z in FIG. 1A. Referring to FIGS. 1A and 1B, the switchboard assembly includes a housing 1 formed of rectangular steel plates. In the housing 1, a lower cable compartment 103g and a lower circuit breaker compartment 104G are partitioned by a partition plate 102G, and an upper cable compartment 103H and an upper circuit breaker compartment 104H are partitioned by a partition plate 102H. Partition plates 108 and 109 define a conductor compartment 104K between the lower breaker compartment 104G and the upper breaker compartment 104H, and three-phase power supply buses 50 and 51 are disposed in this conductor compartment 104K. The conductor compartment 104K is divided into two small compartments by a partition wall 121. The breaker compartments 104G and 104H are provided with openable doors 144G and 144H respectively, and relays 105G and 105H for controlling circuit breakers 10G and 10H are mounted on these doors 144G and 144H respectively. Thus, the switchboard assembly consisting of two vertically stacked switchboards is formed.

Power supply side disconnecting parts 16G and load side disconnecting parts 17G are mounted on the respective partition plates 108 and 102G in the lower breaker compartment 104G. Similarly, power supply side disconnecting parts 16H and load side disconnecting parts 17H are mounted on the respective partition plates 109 and 102H in the upper breaker compartment 104H. It will be seen that the upper and lower disconnecting parts are mounted to confront each other in opposite directions.

Figure 2:
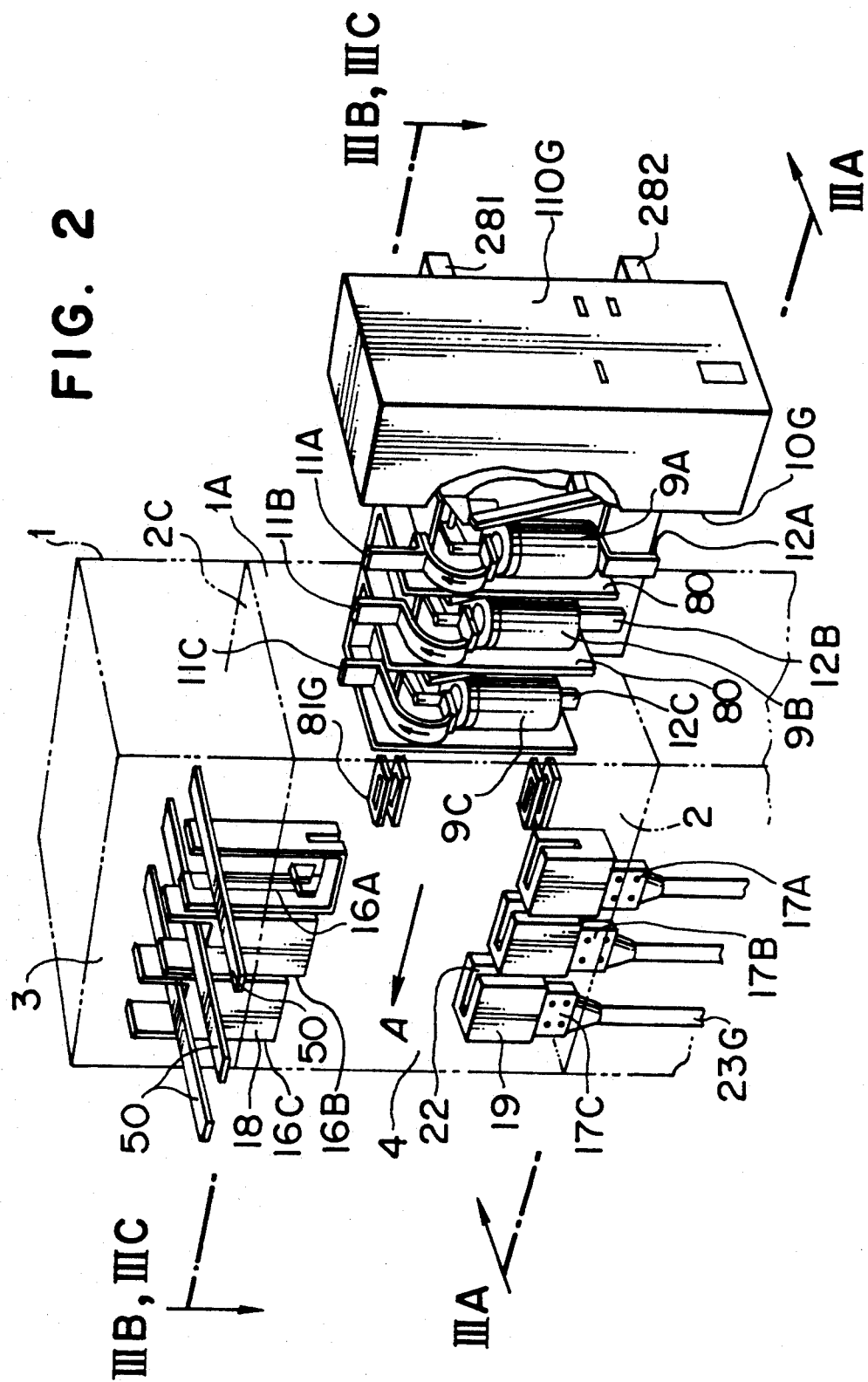
FIG. 2 is a perspective view of the lower circuit breaker shown in FIG. 1B.

FIG. 2 shows the lower circuit breaker 10G in a perspective fashion. Referring to FIG. 2, the power supply side disconnecting parts 16G shown in FIG. 1B are composed of power supply side conductors 16A, 16B, 16C and circuit breaker contact members 11A, 11B, 11C. Similarly, the load side disconnecting parts 17G are composed of load side conductors 17A, 17B, 17C and circuit breaker contact members 12A, 12B, 12C. The circuit breaker 10G is driven to move into and out of the breaker compartment 104G thereby electrically connecting and disconnecting the power supply side disconnecting parts 16G to and from the load side disconnecting parts 17G.

Figure 4:
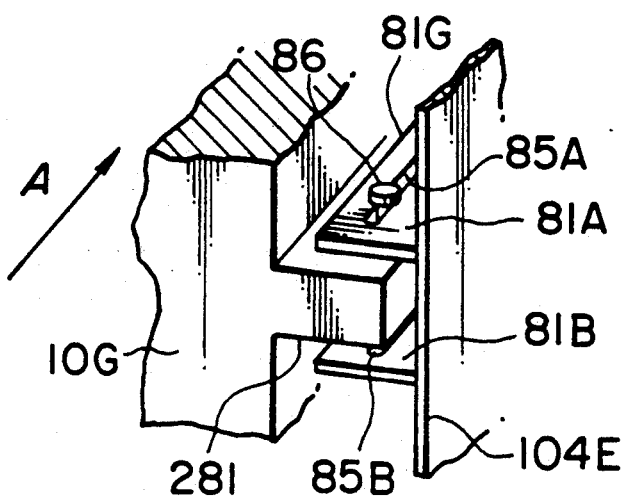
FIG. 4 is a schematic perspective view of the guide part in the switchboard assembly of two-stage stacked type shown in FIGS. 1A and 1B.

The circuit breaker 10G shown in FIG. 2 is withdrawably supported by guides 81G and 82G mounted on a side plate 104E of the breaker compartment 104G shown in FIG. 1A. FIG. 4 is a schematic perspective view of the guide 81G.

As shown in FIG. 4, the guide 81G is composed of a pair of supporting seats 81A and 81B so that a projection 281 provided on the circuit breaker 10G is held between these seats 81A and 81B. Slots 85A and 85B formed on the respective seats 81A and 81B extend in the depthwise direction A of the breaker compartment 104G, and a pin 86 is received in these slots 85A and 85B, so that the guide 81G supports the circuit breaker 10G so as to be slidable in the depthwise direction of the breaker compartment 104G. In the illustrated embodiment, the guides 81G and 82G are shown provided on one of the side plates 104E only. However, these guides are preferably provided also on the confronting side plate.

In the switchboard assembly of two-stage stacked type embodying the present invention, power supply side stationary disconnector covers 18 of a electrical insulator for protecting the power supply side conductors 16A, 16B, 16C are disposed opposite to load side stationary disconnector covers 19 of an electrical insulator for protecting the load side conductors 17A, 17B, 17C, as shown in FIG. 2. Each of the load side stationary disconnector covers 19 is formed with a load side contact slot 22, and load cables 23G extend from the load side conductors 17A, 17B and 17C received in these slots 22 respectively. When the circuit breaker 10G is inserted into the breaker compartment 104G, the load side contact members 12A, 12B and 12C make electrical contact with the load side conductors 17A, 17B and 17C in the load side stationary disconnector covers 19 respectively. Thus, in the illustrated embodiment, the electrical contact parts are enclosed by the load side stationary disconnector covers 19 thereby ensuring the safety of the operator.

Figure 3A:
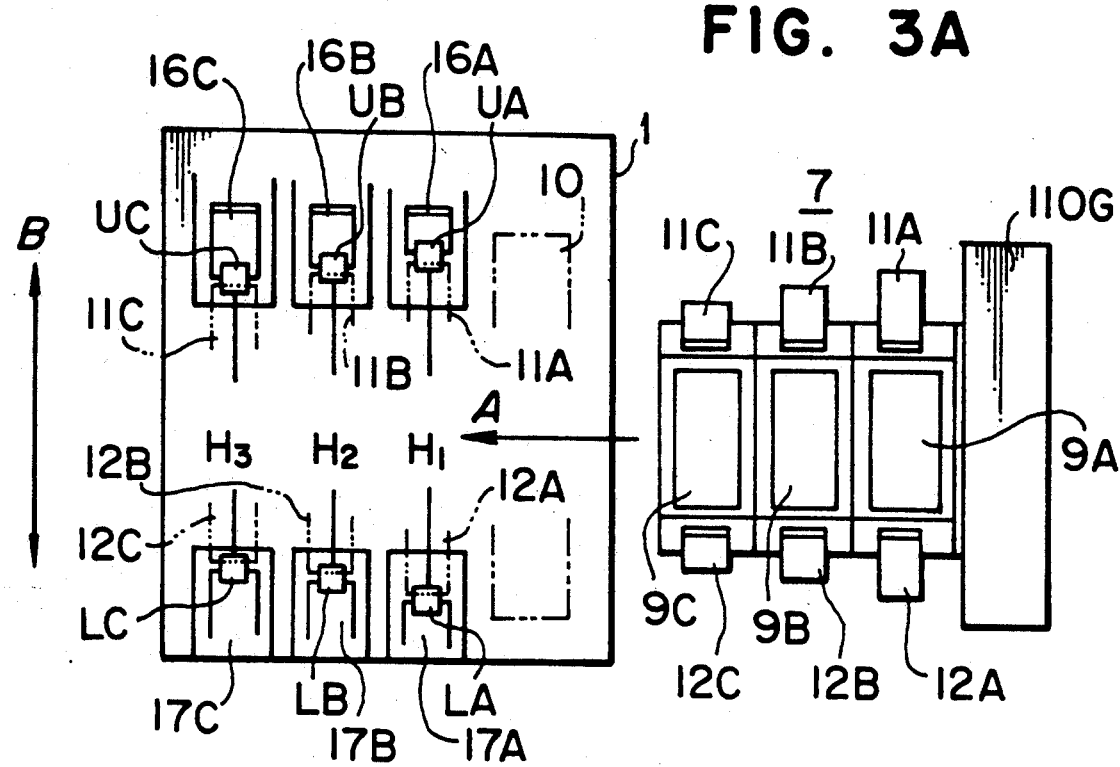
FIG. 3A is a schematic side elevational view of the switchboard before insertion of the circuit breaker into the circuit breaker compartment when viewed from the direction of the line IIA—IIA in FIG. 2.
Figure 3C:
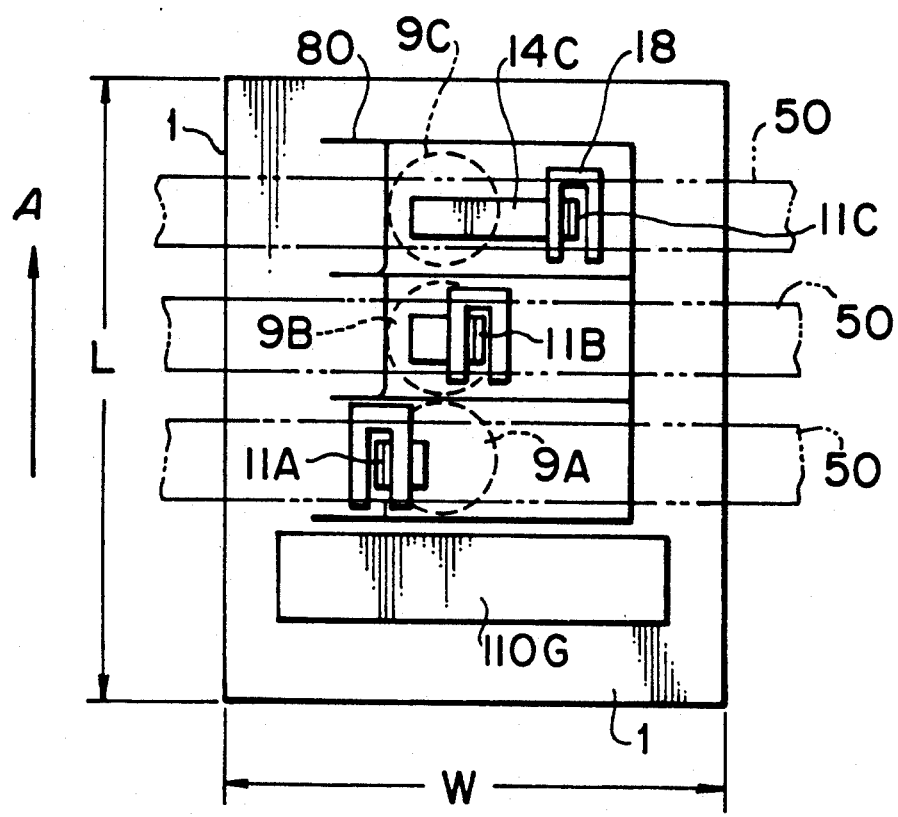
FIG. 3C is a schematic plan view of the switchboard after insertion of the circuit breaker into the breaker compartment when viewed from the direction of the line IIC—IIC in FIG. 2.
Figure 3B:
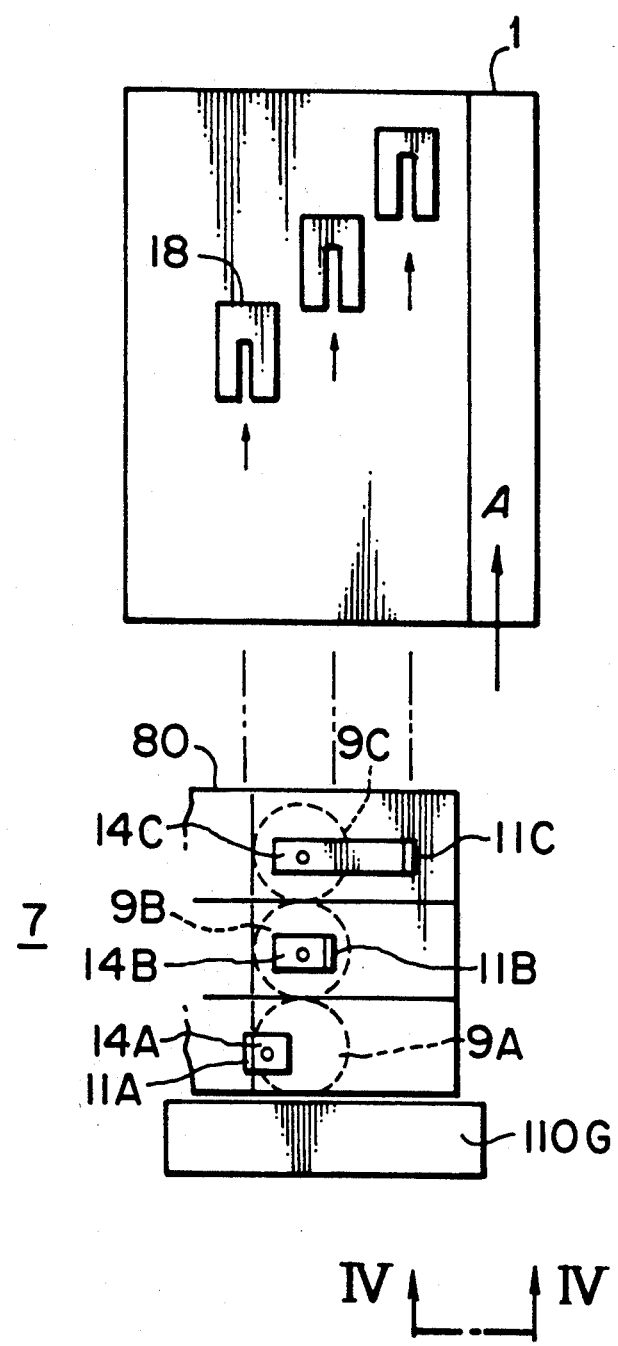
FIG. 3B is a schematic plan view of the switchboard after insertion of the circuit breaker into the breaker compartment when viewed from the direction of the line IIB—IIB in FIG. 2.

FIGS. 3A, 3B and 3C show the circuit breaker 10G inserted into or withdrawn from the breaker compartment 104G. FIG. 3B is a top plan view of the circuit breaker 10G shown in FIG. 3A, and FIG. 3C shows that the circuit breaker 10G is inserted into the breaker compartment 104G from the position shown in FIG. 3B.

The three-phase power supply buses 50 are disposed in the lower compartment of the conductor compartment 104K. These power supply buses 50 extend on the breaker compartment 104G in the direction of the switchgear line-up.

The circuit breaker 10G carries three-phase breaking parts 9A, 9B, 9C and an actuator 110G actuating these breaking parts. In the illustrated embodiment, a vacuum circuit breaker is used as the circuit breaker 10G. The three-phase circuit breaking parts 9A, 9B and 9C are disposed along the depthwise direction A of the breaker compartment 104G. That is, the three-phase breaking parts 9A, 9B and 9C are arrayed along the moving direction of the circuit breaker 10G. The three-phase breaking parts 9A, 9B and 9C are partitioned from each other by electrical insulating barriers 80. The actuator 110G causes vertical movement of a drive shaft (not shown) provided for driving each of the breaking parts thereby causing vertical movement of the contact members of the respective breaking parts. As a result, movable contacts disposed in the breaking parts are moved toward and away from associated stationary contacts thereby electrically closing or opening the circuit.

Referring to FIG. 3B, horizontal parts (horizontal members) 14A, 14B and 14C extend from the positions upper relative to the three-phase breaking parts 9A, 9B and 9C respectively of the circuit breaker 10G. These horizontal members 14A, 14B and 14C are such that their lengths are progressively increased in the depthwise direction A from the insertion opening of the breaker compartment 104G. Similar horizontal members (not shown) extend from the positions lower relative to the breaking parts 9A, 9B and 9C respectively of the circuit breaker 10G. The power supply side contact members 11A, 11B and 11C extend upwardly from the free ends of the upper horizontal members 14A, 14B and 14C respectively, and the load side contact members 12A, 12B and 12C extend downwardly from the lower horizontal members respectively, so that they can be electrically connected to the power supply side conductors 16A, 16B, 16C and the load side conductors 17A, 17B, 17C respectively.

As shown in FIG. 3B, the power supply side contact members 11A, 11B and 11C are dimensioned so that they are progressively distant (displaced) from the associated breaking parts 9A, 9B and 9C respectively along the depthwise direction A from the breaker insertion opening of the housing 1. That is, as shown in FIG. 3C, the distance (the length of the horizontal member 14C) between the C-phase power supply side contact member 11C and the C-phase breaking part 9C is selected to be longer than that between the B-phase power supply side contact member 11B and the B-phase breaking part 9B, and the A-phase power supply side contact member 11A is located on the other side relative to these power supply side contact members 11B and 11C. It is apparent that the same applies also to the load side contact members 12A, 12B and 12C.

Further, as shown in FIG. 3A, the power supply side conductors 16A, 16B, 16C and the load side conductors 17A, 17B, 17C are arranged so that the spacings H1, H2 and H3 between them are progressively decreased along the depthwise direction A from the breaker insertion opening of the housing 1. That is, there is the following relation in FIG. 3A:

$$H1 > H2 > H3$$

The lengths of the power supply side contact members 11A, 11B, 11C and those of the load side contact members 12A, 12B, 12C are correspondingly adjusted.

Thus, because of the arrangement described above, the power supply side and load side contact members 11A, 11B, 11C, 12A, 12B and 12C can be reliably brought into electrical contact with the power supply side and load side conductors 16A, 16B, 16C, 17A, 17B and 17C of the respective phases without colliding against the conductors of the other phases at the time of insertion of the circuit breaker 10G into the breaker compartment 104G. Therefore, undesirable damage to the contact members and conductors at the time of the connection work can be prevented. Further, because the contact members 11A, 11B, 11C, 12A, 12B and 12C are located in a relation displaced in the widthwise direction of the switchboard, the electrical connections can be easily visually observed from the front side of the switchboard. Because of the features described above, the circuit breaker 10G can be easily mounted in position and dismounted from the position thereby improving the working efficiency.

According to the present invention, the three-phase breaking parts 9A, 9B and 9C disposed in the widthwise direction in the case of the prior art switchboard are disposed in the depthwise direction A thereby reducing the width of the switchboard. Further, according to the present invention, the power supply side disconnecting parts 16G and the load side disconnecting parts 17G disposed in the depthwise direction in the case of the prior art switchboard are disposed in the direction B longitudinal with respect to the moving direction A of the circuit breaker 10G thereby reducing the depth of the switchboard. Therefore, the overall size of the switchboard can be reduced. In the illustrated embodiment of the present invention, such switchboards are stacked over two stages so that the overall size of the switchboard assembly consisting of a plurality of switchboards can be greatly reduced.

Further, because the power supply side disconnecting parts 16G and the load side disconnecting parts 17G are disposed in the direction B longitudinal with respect to the moving direction A of the circuit breaker 10G so that the lengths of the electrical conductor connecting between the electrical parts can be shortened.

Further, as shown in FIGS. 1B and 2, the lower power supply side conductors 16A, 16B, 16C and the upper power supply side conductors are directly connected to the respective power supply buses 50 and 51 in the conductor compartment 104K so as to minimize the number of the electrical connections. Further, the partition wall 121 is located at the position substantially middle of the conductor compartment 104K so that, even when a failure may occur in one of the upper and lower switchboards, the other may not be adversely affected by the failure.

In the illustrated embodiment, the contact members 11A, 11B, 11C, 12A, 12B and 12C are disposed at the relatively displaced positions, and their lengths are also changed (adjusted). However, only one of these requirements may be satisfied.

Figure 5:
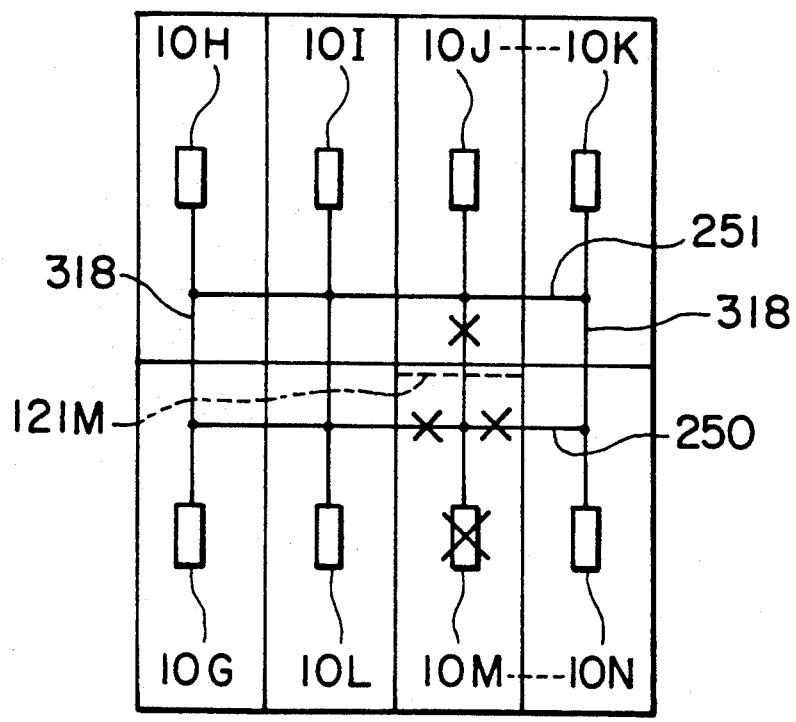
FIG. 5 shows power supply buses connected to form a loop circuit in another embodiment of the present invention.

FIG. 5 shows a power supply bus connection mode in another embodiment of the present invention. This embodiment is generally similar in structure to the embodiment shown in FIGS. 1A and 1B except that the partition walls 121M are detachable. In FIG. 5, the partition walls 121M are usually removed, and short conductors 318 connecting a lower power supply bus 250 with an upper power supply bus 251 are located in that area so that these power supply buses 250 and 251 form a loop circuit.

Such a loop circuit can be easily formed by merely connecting the power supply buses 250 and 251 by the short conductors 318, because upper circuit breakers 10H, 10I, 10J, 10K and lower circuit breakers 10G, 10L, 10M, 10N are disposed opposite to each other respectively, and the lower and upper power supply buses 250 and 251 are disposed in the same conductor compartment. A large current can be uniformly distributed to the individual switchboards because the power supply buses form the loop circuit.

Further, the connection of the power supply buses into the loop circuit can quickly deal with a failure. When, for example, a failure occurs in the switchboard having the circuit breaker 10M, the loop circuit is cut at positions indicated by the symbols X, so that the failed switchboard having the circuit breaker 10M can be easily cut off from the loop circuit, and undesirable spreading of the failure can be prevented. That is, when the switchboard having the circuit breaker 10M fails to properly operate, the power supply from all the power supply buses is temporarily stopped. During this power supply interruption period, the failed switchboard is disconnected by removing the conductor 318 indicated by the symbol X, and the power supply is then restored. Even in such a condition, the power can be supplied to the remaining switchboards.

After removal of the conductor indicated by the symbol X, the corresponding partition wall 121M is mounted in position. Thus, the inspection or like work can be safely achieved.

In the embodiment shown in FIG. 5, the switchboard under failure is disconnected by removing the associated conductor 318. However, it is preferable to interpose switches in the respective conductors 318 so that the failed switchboard can be more quickly disconnected. Further, instead of the provision of the two sets of the lower and upper three-phase power supply buses 250 and 251, one set of three-phase power supply buses may be provided in common to the upper and lower circuit breakers.

Figure 6:
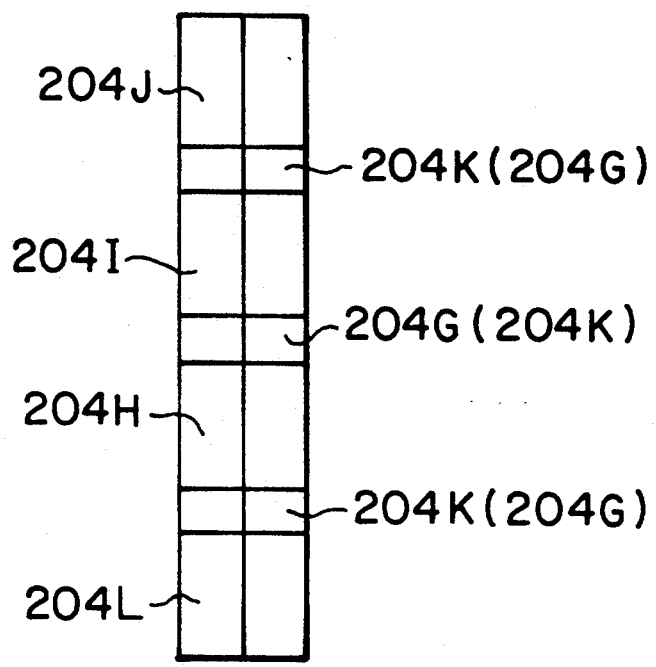
FIG. 6 schematically shows a switchboard assembly of four-stage stacked type which is still another embodiment of the present invention.

FIG. 6 shows still another embodiment of the present invention in which switchboards are stacked over fours stages. Referring to FIG. 6, conductor compartments 204K are disposed between breaker compartments 204L, 204H and between breaker compartments 204I, 204J, and a cable compartment 204G is disposed between the breaker compartments 204L, 204H and the breaker compartments 204I, 204J. The conductor compartment 204K and the cable compartment 204G may be exchanged. In such a case, the load cables may form a loop circuit, and the individual load cables may be led out from this loop circuit. On the other hand, when the switchboards are stacked over odd stages, for example, three stages, the cable compartment 204G may be located on the cable outgoing side of the conductor compartments 204K, although not shown in FIG. 6. Thus, by stacking the switchboards over three or more stages, the floor area that is occupied by the switchboards can be further reduced.

Figure 7:
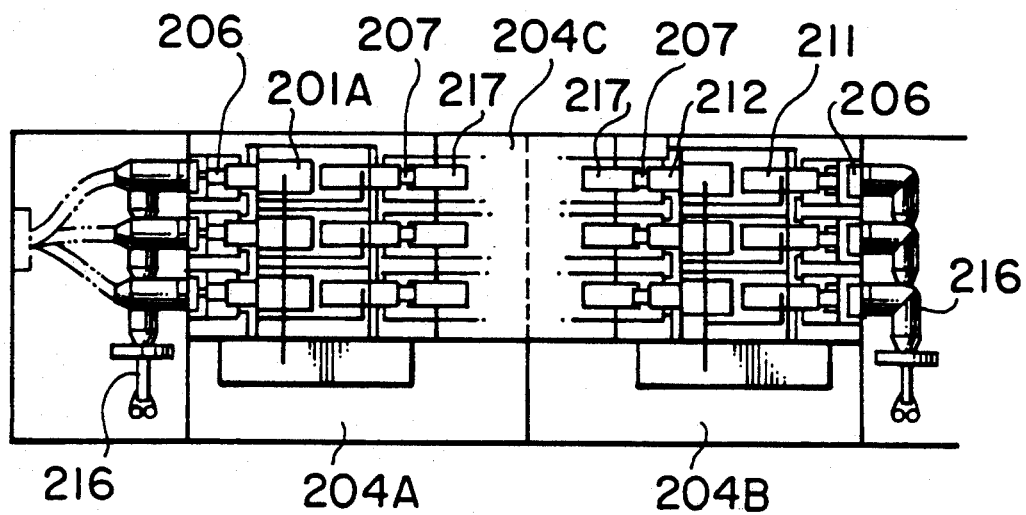
FIG. 7 schematically shows yet another embodiment of the present invention in which two switchboards are horizontally arrayed side by side.

FIG. 7 shows yet another embodiment of the present invention. In the case of the embodiment shown in FIGS. 1A and 1B, the switchboards are stacked over two stages in the direction vertical with respect to the floor surface. In the case of the embodiment shown in FIG. 7, the switchboards are arrayed side by side in the direction horizontal with respect to the floor surface, and the circuit breakers are inserted into and withdrawn from the breaker compartments in the direction vertical with respect to the surface of the drawing sheet. Thus, according to this embodiment, the switchboard assembly has a small height.

While particular embodiments of the present invention have been shown and described, it will be obvious to those skilled in the art that various changes and modifications may be made without departing from the present invention in its broader aspects.

I claim:

1. A multi-phase switchboard which is stackable in a first direction with at least one other switchboard, both having substantially the same structure, said switchboard comprising:

a multi-phase power supply side disconnecting device including a plurality of first disconnecting parts to be connected to power source conductors of respective phases of a multi-phase power source;

a multi-phase load side disconnecting device including a plurality of second disconnecting parts corresponding to said first disconnecting parts, respectively, to be connected to load conductors of respective phases of a multi-phase load; and a multi-phase movable circuit breaker device including a plurality of circuit breakers of respective phases, each circuit breaker including a breaker part and first and second contacts extending from said breaker part, said circuit breaker device being mounted movably in a second direction different from said first direction between a first position where said first and second contacts of the respective circuit breakers disengage from said first and second disconnecting parts, respectively, thereby disconnecting said first disconnecting parts from said second disconnecting parts and a second position where said first and second contacts engage with said first and second disconnecting parts, respectively, thereby connecting the first disconnecting parts through said circuit breakers to the corresponding second disconnecting parts, respectively, wherein said power supply side disconnecting device, said circuit breaker device and said load side disconnecting device are disposed in that order in a third direction perpendicular to said second direction, said breaker parts are substantially aligned along a line parallel to said second direction, and the first and second contacts of the respective phases include respective first portions which extend in a direction perpendicular to said second and third directions and are made successively longer in an order of locations of the associated phases in a direction from said first position toward said second position and respective second portions extending from said first portions, respectively, in said third direction so that when said circuit breaker device is moved between said first and second positions, said first and second contacts of the respective phases move along different paths, and said first and second disconnecting parts of the respective phases are disposed correspondingly to said first and second contacts of the respective phases.

2. A multi-phase switchboard according to claim 1, wherein said first and third directions are a vertical direction and said second direction is a horizontal direction perpendicular to said first direction.

3. A multi-phase switchboard according to claim 1, wherein said first direction is a horizontal direction, said second direction is a horizontal direction perpendicular to said first direction and said third direction is a vertical direction.

4. A multi-state switchboard assembly comprising:

at least two switchboard stacks disposed side by side along a line extending in a first direction, each stack including nat least upper and lower switchboards vertically stacked;

each of said upper and lower switchboards comprising:

a casing having a circuit breaker compartment and a conductor compartment, power source conductors provided in the conductor compartment to be connected to three-phases of a three-phase power source, respectively, a multi-phase power supply side disconnecting device provided in said circuit breaker compartment and including a plurality of first disconnecting parts connected to said power source conductors, a multi-phase load side disconnecting device provided in said circuit breaker compartment and including a plurality of second disconnecting parts corresponding to said first disconnecting parts, respective, to be connected to load conductors of respective phases of a multi-phase load, and a multi-phase movable circuit breaker device provided in said circuit breaker compartment and including a plurality of circuit breakers of respective phases, each circuit breaker including a breaker part and first and second contacts extending from said breaker part, said circuit breaker device being mounted movably in a second direction perpendicular to said first direction between a first position where said first and second contacts of the respective circuit breakers disengage from said first and second disconnecting parts, respectively, thereby disconnecting said first disconnecting parts from said second disconnecting parts and a second position where said first and second contacts engage with said first and second disconnecting parts, respectively, thereby connecting the first disconnecting parts through said breaker parts to the corresponding second disconnecting parts, respectively, wherein said power supply side disconnecting device, said circuit breaker device and said load side disconnecting device are substantially aligned vertically in that order, said breaker parts are substantially aligned along a line parallel to said second direction, and the first and second contacts of the respective phases include respective first portions which extend in a horizontal direction perpendicular to said second direction and are made successively longer in an order of locations of the associated phases in a direction from said first position toward said second position and respective second portions vertically extending from said first portions, respectively, so that when said circuit breaker device is moved between said first and second positions, said first and second contacts of the respective phases move along different paths, and said first and second disconnecting parts of the respective phases are disposed correspondingly to said first and second contacts of the respective phases;

wherein said conductor compartment of said upper switchboard is formed in a lower side of said casing of said upper switchboard and said conductor compartment of said lower switchboard is formed in an upper side of said casing of said lower switchboard so that said conductor compartment of said upper switchboard is disposed adjacent to said conductor compartment of said lower switchboard; and a loop conductor connecting said power source conductors of said upper and lower switchboards of one of said at least two switchboard stacks and said power source conductors of said upper and lower switchboards of the other switchboard stack in a loop.

* * * * *